United States Patent [19]

Ruzumna

[11] Patent Number: 4,577,710

[45] Date of Patent: Mar. 25, 1986

[54] APPARATUS FOR PROMOTING GOOD HEALTH

[76] Inventor: Edward Ruzumna, 3974 Winterset Ct., West Bloomfield, Mich. 48003

[21] Appl. No.: 560,341

[22] Filed: Dec. 12, 1983

[51] Int. Cl.[4] .............................................. G01G 23/00
[52] U.S. Cl. ...................................... 177/245; 177/25; 364/567
[58] Field of Search .................... 177/25, 245; 364/567

[56] References Cited

U.S. PATENT DOCUMENTS

| | | | |
|---|---|---|---|
| 4,084,242 | 4/1978 | Conti | 177/25 X |
| 4,318,447 | 3/1982 | Northcutt | 364/567 X |
| 4,377,214 | 3/1983 | Hansen et al. | 177/25 |
| 4,423,792 | 1/1984 | Cowan | 177/25 |
| 4,462,473 | 7/1984 | Valestin | 177/25 |

*Primary Examiner*—George H. Miller, Jr.
*Attorney, Agent, or Firm*—Stephenson & Boller

[57] ABSTRACT

Apparatus for promoting good health comprising a personal weight scale provided with an information and message center for displaying messages to the user relating to weight and maintenance of a desired weight. The scale may be embodied in a standard version for providing standard messages based upon departure of measured weight from desired weight. In another embodiment, the scale is adapted to provide customized information related to a particular medical condition of the particular user. The scale contains an electronic microprocessor for providing messages. The scale may be adapted to a customized form by associating a removable electronic medium with the electronic microprocessor so as to adapt a basic operating program into a custom one for providing custom messages. The custom messages may relate to the particular health condition.

2 Claims, 6 Drawing Figures

CURRENT WEIGHT =

COMPUTED OVERWEIGHT =

COMPUTED CLOTHING SIZE =

*Fig. 3*

REINFORCEMENT

MESSAGE

APPARATUS FOR PROMOTING GOOD HEALTH

BACKGROUND AND SUMMARY OF THE INVENTION

This invention relates to a device for promoting good health. More specifically, the invention is embodied in a new and unique personal weight scale which provides health promoting messages based upon the user's weight and certain other input information which is entered into the scale.

It is recognized that an individual's weight has a major bearing on health. The predominant concern for most individuals is to guard against overweight, but underweight conditions can also be of concern. Personal weight scales provide a ready means for an individual to monitor one's own weight. Mere monitoring of one's own weight is however, in many cases, an insufficient motivation to encourage the individual toward proper weight maintenance.

Electronic types of personal weight scales have been developed and are on the market. Those on the market which are known to applicant merely comprise an electronic readout display of the individual's measured weight. A recently issued U.S. Pat. No. 4,366,873 proposes an electronic weight scale which has the capability for providing the individual's weight and an audible message based upon the measured weight and certain inputs.

The present invention is directed to a novel personal weight scale with the capability for providing visible message displays to the user based upon the user's measured weight and certain inputs. With the present invention, it is believed that improved motivation toward proper weight maintenance for an individual is obtainable, and this is accomplished in one respect through the nature of the display messages which are given.

In another respect the invention is adapted to address particular health problems for which proper weight maintenance is especially important. These adaptations endow the apparatus of the invention with a personalized character for a particular individual suffering from a particular health condition. These adaptations also provide message displays for the individual which are related to that individual's particular health problem.

Although one preferred embodiment of the present invention is disclosed herein, principles of the invention may be incorporated in different embodiments. The invention possesses new and unique features which contribute to the health promotive character of the apparatus embodying the invention.

For example, according to one aspect, the apparatus is provided with inputs which are set by the individual user based upon certain personal factors of that individual, for example, body size, sex, and age. Hence, the apparatus is rendered useful for any individual.

According to another aspect the apparatus may be customized for a particular individual or certain particular individuals. An especially convenient way to adapt the apparatus to a customized form is by providing the apparatus with the ability to accept customized data such as from a cassette, cartridge or tape containing certain customized data. The apparatus acts upon the customized data for a particular individual so that when that individual uses the apparatus, it displays certain informational and motivational messages which are uniquely adapted for that particular individual.

Importantly, according to this aspect of the invention, the apparatus may be tailored to address a particular health condition or health conditions of the individual with the objective that the displayed information and messages will encourage the individual into proper habits geared toward correction of the particular health problem or problems involved.

Still another aspect of the invention involves the manner in which the apparatus presents information to the user. This will be true regardless of whether the apparatus is customized for a particular individual or whether it has general utility for any person. This method of presentation involves the visual presentation on a message center of a first message display containing certain data. Subsequently, this message display is erased and replaced by a second display containing a message for the individual user. This latter message is intended to encourage the individual into a desired regimen by a reinforcement technique. Where the apparatus has general utility and is not customized for any particular individual, these messages are standardized messages. The particular one of the standardized messages which is given depends upon the departure of the actual measured weight from a standardized or normal average weight for an individual of the same body size, sex, and age. These messages may be either laudatory or critical with the exact nature of the message being dependent upon the departure of the measured weight from the standardized weight. In other words, the greater the departure from the standardized weight, the more critical the message will be. Where the measured weight is close to the desired weight, the message will be laudatory.

In a situation where the apparatus is adapted to a particular health condition for a particular individual, the message given will contain reference to either the health condition itself and/or factors related to that health condition. It is possible for a standard set of messages to be developed for each condition, or alternatively it is possible to have a particular set of messages prepared for a particular individual on a totally unique basis. These messages could be prepared by an attending physician who has intimate knowledge of the individual's particular condition and personality so as to achieve what would be considered to be the best type of motivational procedure for the individual. Because of the availability of readily programmable electronic devices it is possible for the physician to prescribe particular messages which can be readily incorporated into an appropriate medium such as a tape, cassette, cartridge, or similar device which may be removably plugged into the apparatus. It is however, also possible for a prescribing physician to prescribe a completely unique scale for a particular individual which would be constructed with only messages for that particular individual and for no other individual.

The preferred embodiment of the apparatus comprises an electronic system, including a microprocessor and a visual readout display, which can be used to advantage to implement the invention. The microprocessor is provided with an operating program and is responsive to certain inputs and to the individual's measured weight. The microprocessor and associated electronic circuitry may comprise storage media containing pre-stored information including such items as weight charts, messages, and other pieces of information. The apparatus has a calculational capability within its operating program to provide calculations based upon the measured weight of the user and weight charts. It may act upon differences between measured weight and the weight charts to provide both a display of the computed difference and messages which are related to the difference. The weight chart and message are also correlated with certain input parameters relating to the individual. These parameters may be introduced by the user, or by other media.

Where the invention is adapted to address particular health problems, a variety of different health problems can be addressed through the use of removable electronic cartridges each of which is unique to a particular type of medical condition. Each cartridge comprises an electronic device such as a PROM (programmable read only memory) which is acted upon by the basic operating program of the microprocessor system. The data contained in the PROM relates to a particular medical condition and the resultant action of the apparatus when a particular type of PROM is associated with the apparatus is to adapt it for use by the individual with the condition which is the subject of the cartridge. Hence, in this embodiment, the basic scale apparatus remains the same and is converted to address a particular health condition by simply inserting the appropriate cartridge for the particular condition.

It is even possible for the cartridges to be tailored to particular individuals by the fabrication of custom electronic cartridges. Hence, the invention may be offered not only as a commercial product it is also well suited for prescriptive use by a physician treating a particular individual for a particular medical condition. The potential benefits for promoting health in individuals are significantly enhanced with the present invention.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
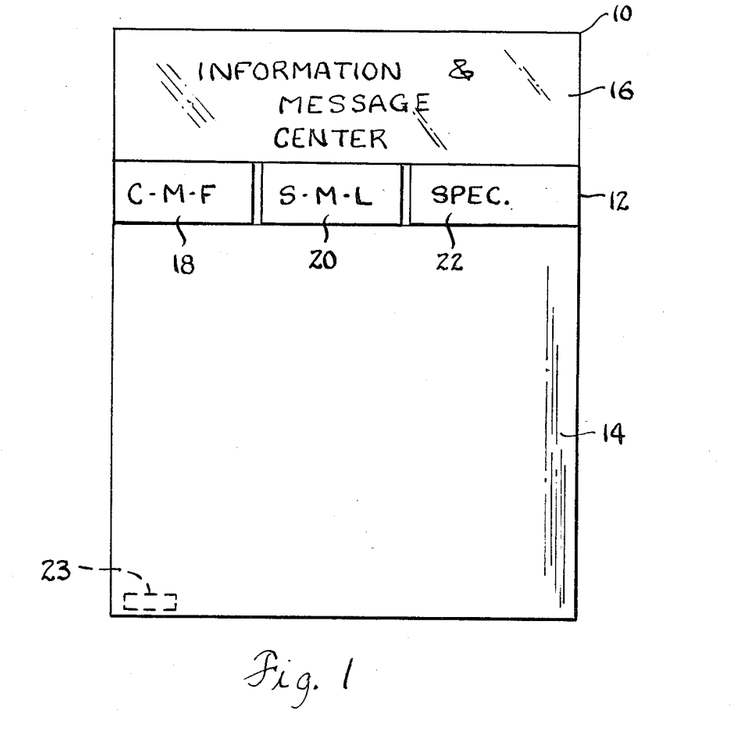
FIG. 1 is a top plan view of a presently preferred embodiment of apparatus according to the present invention.
Figure 2:
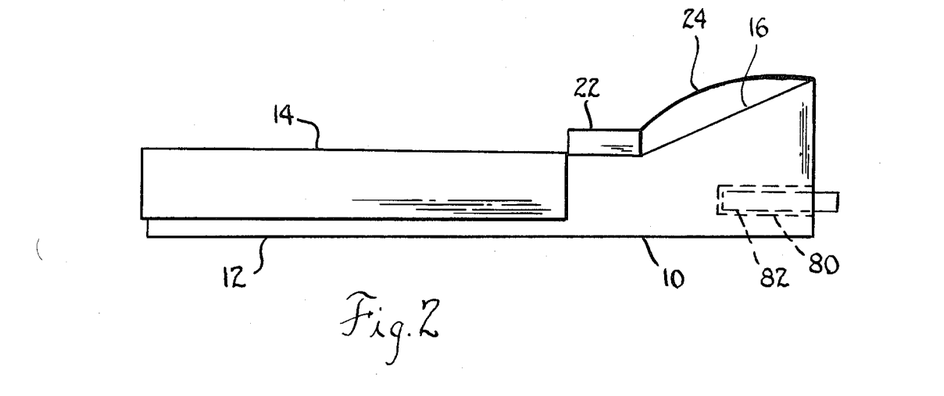
FIG. 2 is a side elevational view of the apparatus of FIG. 1.

FIGS. 1 and 2 illustrate a presently preferred embodiment of apparatus 10 according to the present invention.

Apparatus 10 comprises a base 12 adapted to be placed on a floor, or other supporting surface, and a weighing platform 14 onto which the user steps when the apparatus is put to use. At the rear of base 10 beyond platform 14 is an information and message center 16.

A series of three switches 18, 20 and 22 are mounted on base 12 between weighing platform 14 and information and message center 16. A magnifying lens 24 is disposed over information and message center 16 so as to provide a magnification of the display on center 16 to a user standing upon platform 14.

Details of the internal mechanism for converting the user's weight on platform 14 onto an electrical signal representative of his or her weight are conventional and therefore any suitable construction may be used.

Switches 18, 20 and 22 are intended for use by an individual to set certain conditions. Switch 18 is designated by the letters C-M-F which are abbreviations for "Child", "Male", and "Female" respectively. Switch 20 is identified by the letters S-M-L, and these denote abbreviations for "Small", "Medium", and "Large". Switch 22 is identified by the abbreviation SPEC. meaning "Special".

The purpose of switch 22 is to convert the apparatus into one which will adapt it to a customized mode of operation for a particular individual. Exactly how this is accomplished will be explained later on in the description. For now, the operation of the apparatus will be explained for a standardized operation for any particular individual user who will use switches 18 and 20.

Apparatus 10 is provided with a weight responsive switch 23 which is activated above a predetermined threshold, say 25 lbs for example, and this switch turns on the power for the apparatus. Power may be obtained from a self-contained supply such as a replaceable battery. Alternately, it would be possible to have the apparatus constructed to use standard AC power by a plug and cord extending from base 12 to be plugged into a wall outlet receptacle. In any event, the activation of threshold switch 23 initiates the operation of the apparatus and it causes the following message to be displayed on center 16: "Please program". This instruction is contained on the uppermost line of the display and immediately below the instruction, the following question is posed. "C, M, or F?" This question asks whether the user is a child, an adult male, or an adult female. The answer is given by the user stepping on switch 18. Exactly how the correct information is entered into the electronics is not important. One way which is deemed suitable is to have the display automatically sequence the possible answers once the user steps on switch 18. The three possible answers will cycle at given intervals, for example every two seconds. When the correct answer for the user is presented on the display, the user releases switch 18 and that causes the answer to be stored within the apparatus. The selected answer will continue to be displayed.

A subsequent line of the display then poses the further question: "S, M, or L?" This question asks whether the user is of small, medium or large build. Once again the answer may be provided in the same manner as was the case for the first question. The display will sequentially show the possible answers, S, M, and L at intervals such as at two second intervals and when the correct answer is displayed, the user releases switch 20 and the apparatus locks the answer. The selected answer will continue to be displayed on the message center. Once this second question has been answered, the apparatus proceeds to operate in the following manner. The operation is described with reference to FIG. 5 which illustrates the operating program which is executed by the electronics contained within the apparatus.

Figure 5:
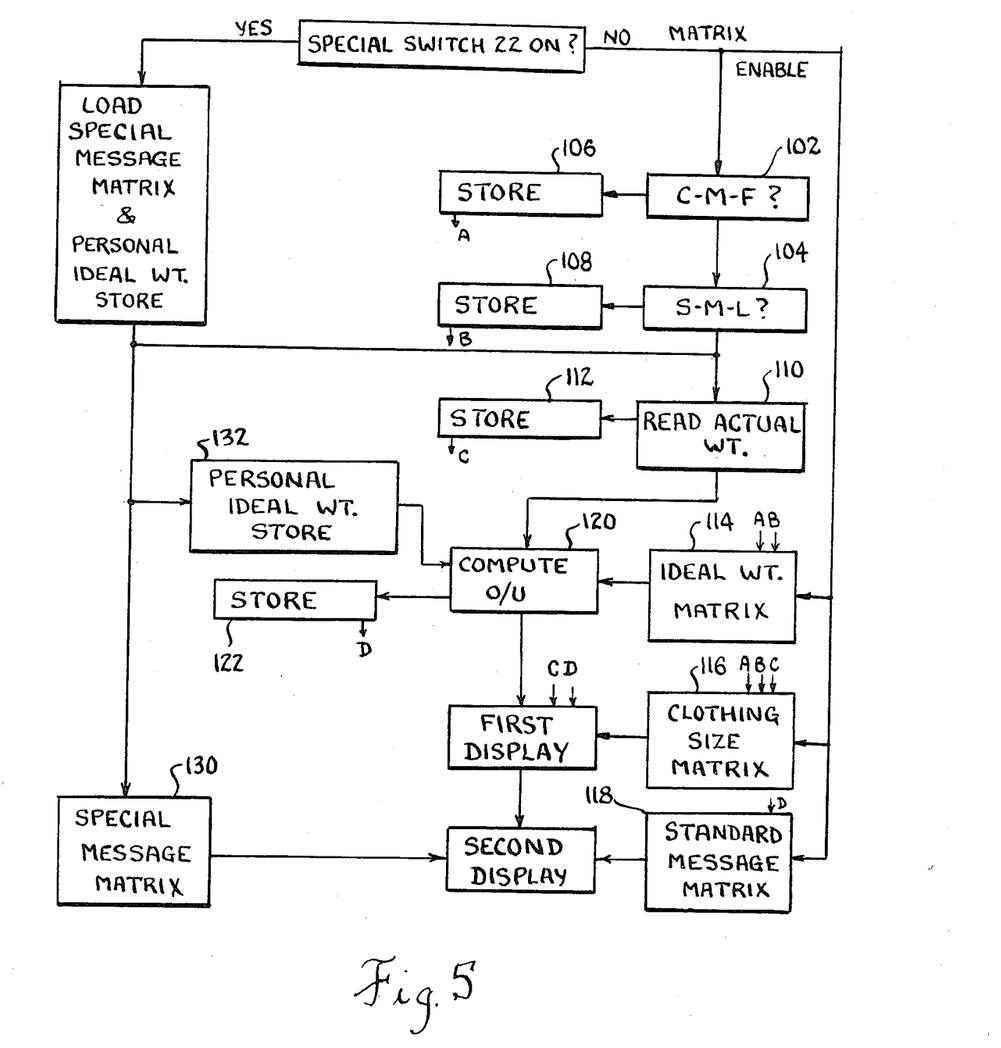
FIG. 5 is a flow diagram illustrating operation of the apparatus of FIG. 1.

When the program first began to operate the control first determines whether switch 22 has been actuated. If that switch has not been actuated, the two questions described above are posed. The block 102 corresponds to the posing of the question regarding child, adult male, adult female. The block 104 corresponds to the posing the question regarding small, medium, large.

Associated with each question is a memory store within the electronics. Each memory store is identified by a corresponding reference numeral 106, 108 respectively. In other words, the store 106 stores the answer for the child, adult male, adult female question, and the store 108 the answer to the small, medium, large question.

At the time that the answers are obtained, the user's actual weight is measured electronically as indicated at 110 and this actual weight measurement is stored in an associated memory store 112. The information contained in the memory stores 106, 108, 112 is used in further operations of the apparatus.

The apparatus further includes certain pre-programmed information which is stored in matrix form. There are three such matrices illustrated, and these are identified by the reference numerals 114, 116 and 118 respectively.

Matrix 114 is designated an Ideal Weight Matrix and it contains a table of ideal weight related both to age and sex and body build. The information in stores 106, 108 is used to select one particular ideal weight from matrix 114.

In other words, the matrix would contain a series of rows which are a function of body build (i.e., small, medium, large) and it would contain a series of columns which are a function of the other parameter (i.e., child, adult male, adult female). Thus, for each combination, there is a corresponding ideal weight.

The matrix 116 is designated as a Clothing Size Matrix. It contains clothing size information which is a function of three parameters, namely the information contained in stores 106, 108 and 112. The values of these three parameters are used to select a corresponding clothing size from matrix 116.

The third matrix 118 is designated as a Standard Message Matrix. This matrix is used to provide a standard message based upon the departure of the measured weight from the ideal weight for the particular person.

It will be observed that all three matrices 114, 116, 118 are associated with the switch 22 such that the matrices are enabled if the switch is not activated after the user steps on the platform. Accordingly, these matrices are enabled when the apparatus is operated in the user programmed mode through the use of switches 18 and 20.

After the actual weight measurement has been obtained, a calculation is performed taking the difference between the actual measured weight and the selected ideal weight from matrix 114. This calculation of weight difference is identified by the reference numeral 120. A memory store 122 is associated with the calculation so that the departure of the measured weight from the ideal weight is stored in that memory store. It will be observed that the weight difference is also provided to the standard message matrix 118 to correlate a particular message with the calculated departure of the measured weight from the ideal weight.

Figure 3:
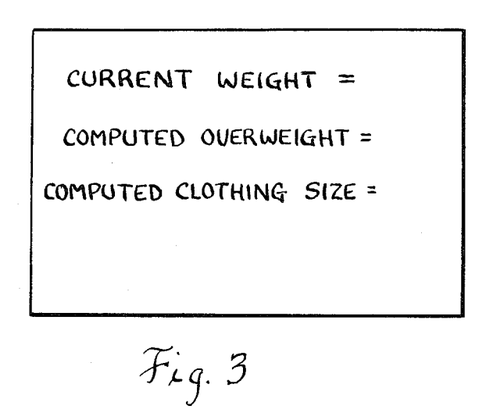
FIG. 3 is a view of one portion of the apparatus of FIG. 1 illustrating one operating condition.

After the calculation of step 120 has been performed and the weight departure stored in memory store 122, information is displayed on information and message center 16. This takes the form of a first display such as that shown in FIG. 3. The information display comprises the current weight, the computed overweight and the computed clothing size. This information is presented for a predetermined time interval. After the elapse of that time interval the message is erased and replaced by a reinforcement message developed from the standard message matrix 118. As can be appreciated, this reinforcement message comprises the particular stored message in the matrix correlated with the departure of the individual's measured weight from the idealized weight. The particular nature of the stored messages is such that the messages are either laudatory or insulting depending upon the departure of measured weight from the idealized weight. For example, laudatory messages would be given for close compliance of measured weight with standardized weight. Insulting messages will be given for departures from the standard weight with the degree of insult increasing as the measured weight increases from the standardized weight.

FIG. 5 also illustrates the customized mode of operation. The apparatus includes a receptacle 80, (see FIG. 2), or other accommodation, for removably accepting a medium 82 such as an electronic memory circuit, tape or other medium. That medium has been programmed with certain information unique to a particular individual or class of individuals. For example, this may be used to address the medical conditions of patients in the manner described above. Thus, when such a medium is associated with the apparatus, the user steps on the scale and instead of operating either switch 18 or 20 now operates switch 22. The operation of switch 22 does not enable the matrices 114, 116, 118. Rather it causes information on the medium to be loaded into a Special Message Matrix 130. It also loads an idealized weight store 132 with the ideal weight for the particular individual involved, the idealized weight also being on the medium. Once these have been loaded, the weight measurement is taken and stored in store 112. Next the departure of the actual measured weight from the idealized weight for the particular individual is calculated. This in turn results in the first message display being presented. This message display presents the actual weight and the departure of the weight from the idealized value for the particular individual. The clothing size is not presented but it would be possible to endow the apparatus with this sort of capability by providing a special clothing size matrix which would be geared to the particular individual involved but based upon his measured weight. After this first information is displayed for a given period, it is erased and replaced by the second display. This second display presents a particular message from the Special Message Matrix which is correlated with the departure of the measured weight from the idealized weight for the particular individual. Importantly, the content of this message relates to the health condition for the particular individual. The message may be made increasingly severe as the departure of weight from the idealized weight increases.

Figure 6:
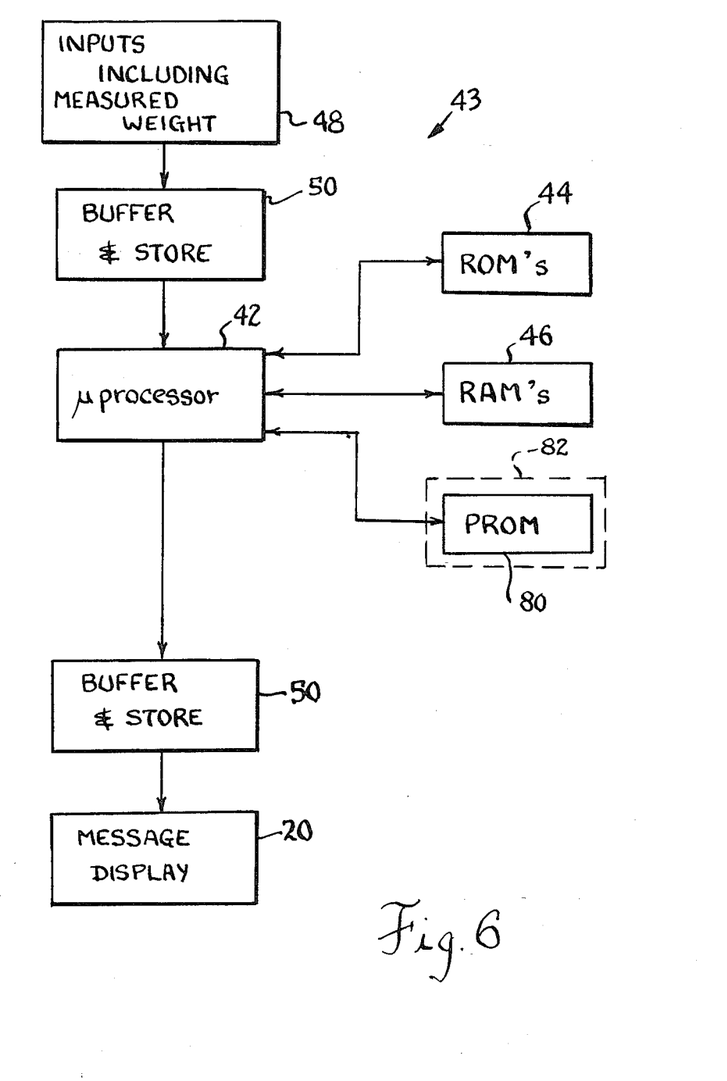
FIG. 6 is an electronic block diagram illustrating the electronics of the apparatus of FIG. 1 which executes a program according to the flow diagram of FIG. 5.

FIG. 6 illustrates in block diagram form the arrangement of the electronic system 43 which is employed in apparatus 10. This electronic system is constructed from conventional electronic devices and is powered from a battery or other suitable electric supply, as mentioned above. These include a microprocessor 42, one or more ROM's 44 (read only memory), and one or more RAM's 46 (random access memory).

The inputs to the system comprise the switch inputs, the media input, and the measured weight of the user. Each of these inputs is processed through a suitable buffer and store, designated generally by the numeral 48, so as to be available in a suitable form for use by microprocessor 42. The microprocessor is also coupled via a buffer and store 50 with message center 16. The ROM's and RAM's 44,46 are operatively associated with the microprocessor.

Figure 4:
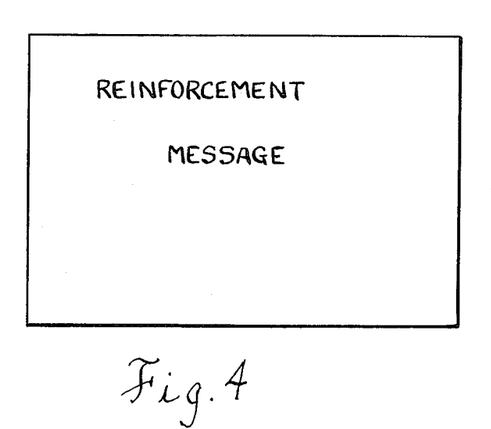
FIG. 4 is a view of one portion of the apparatus of FIG. 1 illustrating an operating condition subsequent to that of FIG. 3.

The various arrows shown between the blocks of the block diagram of FIG. 4 constitute data busses. Conventional control connections (not shown) are also associated with the specific circuit components for controlling the operating sequence.

The ROM's 44 may contain a basic operating program which is acted upon by microprocessor 42 using the input information supplied via the inputs. The RAM's 46 may be used for storage during the operation of the program by the microprocessor. Output data which has been developed through execution of the program is supplied to buffer and store 50 for display on message center 16.

For some individuals, the mere departure of mesured weight from the ideal which would be indicated on a weight chart may be insufficient motivation for proper weight control. Therefore, the second visible display message giving either an insulting or a laudatory remark is subsequently presented.

The message relating to clothing size can also be used for motivation. For a man this message could be given in terms of suit size and for a lady in terms of dress size. An example of such a message might be "Your suit size is 42 but would be 38 if you were at the correct weight".

The basic messages themselves are programmed in the ROM's with the numerical information being supplied by the calculations.

The objective of the apparatus of the invention is to encourage the individual to discipline himself or herself toward attainment and/or maintenance of a healthy weight. The apparatus itself is not a guarantee of weight control but rather is intended to give improved motivation for encouragement of the individual toward the desired weight objective.

The embodiment of the invention which has been described with reference to the drawing figures may be considered for a general weight control program and without regard to any specific medical condition upon which an individual's weight has a bearing.

The invention also provides the capability for relating the apparatus to particular medical conditions by virtue of the customizing capability also described with reference to the drawing figures. The invention gives messages about the effect of overweight on any given health condition of interest with each particular message being a function of the overweight of the user and his or her particular condition.

It would be possible to program the electronics shown in FIG. 6 for yielding messages relating to a particular medical condition. While this would necessitate a unique scale for each type of medical condition, such might be deemed a desirable treatment procedure for weight control.

However, rather than having a unique scale for each medical condition, the invention alternately provides for the embodiment of the apparatus in a basic configuration with which cartridges relating to individual specific conditions are selectively associated. Referring to FIG. 6 one will observe that a further circuit component may be associated with the electronics. This circuit component is illustrated as a PROM (programmable read only memory).

The PROM is contained within a cartridge which removably mounts on the base of the apparatus 10. An example of how the cartridge may mount is illustrated in FIG. 2. The cartridge contains a connector from the PROM which connects to a mating connector within receptacle 80 in base 12 into which the cartridge is removably inserted. The PROM contains data which adapts the basic program into a specific one related to a particular medical condition in the manner described above. While a single PROM has been illustrated, it will be appreciated that multiple PROMs or other equivalent devices could be used.

An example of the application of the invention with respect to a particular medical condition might comprise a PROM which adapts the basic program of the scale for the user having a cardiac condition. In addition to, or in replacement of, one or more of the other messages given (for example, the insulting or laudatory message 70, or the clothing size message 72), the PROM adapted for a cardiac condition may comprise a message relating to the cardiac condition. For instance, one message might be: "Do you realize that pounds overweight adds percent extra load on your heart?" The message relating to the cardiac condition may also be so related that a sterner message is given as the amount of overweight increases.

The apparatus of the invention may therefore serve as a standard scale for use by all individuals, and in special situations, it may be adapted to the treatment needs of individuals with certain medical conditions. As such it is an apparatus for promoting good health through a recognition of an individual's weight in relation to standardized weight charts, and it provides means for psychologically reinforcing the weight information in relation to standardized weight charts by means of reinforcement messages. It is also possible with the invention for unique message cartridges (custom cartridges) to be developed for use by specific individuals, tailored to those specific individual's particular needs. For example, this could be done under the supervision of attending medical personnel so that particular messages for a particular patient would be presented to the patient when using the apparatus of the invention during the course of a treatment or recovery procedure.

The apparatus of the invention is also adapted for use in monitoring health conditions which are not necessarily abnormal. For example, it may be used very effectively in a weight maintenance program related to a term of pregnancy. Massages may be given related to departure of measured weight from a normal progression of weight over the term. For undesired departures, the messages may be related tO either or both the effect on the mother and the effect on the fetus.

Referring to FIG. 5, one example of use of the invention could comprise a series of media 82 each programmed for use during a particular part of the term, for instance one medium for each month. Each medium of the series would contain a desired normal weight for the corresponding month, and it would contain data for causing certain messages to be given based upon departure of measured weight from the desired normal weight for that month. The messages could themselves be unique for each month.

New media could be used during the post-natal period to promote return toward the normal non-pregnant weight. Pregnancy being a temporary condition, it can be appreciated that conditions which the invention addresses need not be of a permanent character.

This description of the application of the invention for a term of pregnancy is representative.

While a preferred embodiment of the invention has been disclosed, it will be appreciated that principles of the invention are applicable to other embodiments.

What is claimed is:

1. Apparatus for promoting good health and addressing both the user's weight and a particular medical condition other than departure of the user's weight from a standardized weight but which bears a medically recognized correlation with departure of a user's weight from a standardized weight, comprising a scale having a weighing platform onto which a user steps, a display for displaying information to the user standing on the platform and control means acting upon the measured weight of the user and certain other inputs, including an electronic medium which is manually installable on and removable from the apparatus and contains data relating to the particular medical condition correlated with departure of measured weight from standardized weight, to provide messages on the display relating to both departure of the user's measured weight from a standardized weight and also to the particular medical condition with respect to which departure of measured weight from desired weight has a medically recognized correlation, the particular message presented on the display relating to the particular medical condition being developed from departure of the user's measured weight from standardized weight.

2. Apparatus for promoting good health comprising a scale having a weighing platform onto which a user steps, a display for displaying information to the user standing on the platform and control means acting upon the weight of the user and certain other inputs to provide messages on the display relating to the measured weight and departure of the user's measured weight from a desired weight, said control means comprising a microprocessor system, said microprocessor system having a basic operating program for acting upon the measured weight and said inputs to cause standardized messages to be displayed on the display and a receptacle accessible by the user for removably receiving a manually replaceable packaged electronic medium containing data for action upon by the basic program so as to convert the massages into customized ones for a particular individual user, in which said medium contains data relating to a particular medical condition of interest for a particular user other than a condition of weight itself, but which bears a medically recognized correlation with departure of weight from a standardized weight and in which the association of the medium with the control converts the basic operating program into one which causes messages to be displayed to the individual user standing on the scale which are correlated with the particular medical condition and based upon departure of the user's measured weight from the standardized weight.

* * * * *

UNITED STATES PATENT AND TRADEMARK OFFICE
CERTIFICATE OF CORRECTION

PATENT NO. : 4,577,710
DATED : March 25, 1986
INVENTOR(S) : Edward Ruzumna

It is certified that error appears in the above-identified patent and that said Letters Patent is hereby corrected as shown below:

Column 8, line 54, "Massages" should read --Messages--.
Column 8, line 57, "tO" should read --to--.
Column 10, line 9, "deparature" should read --departure--.
Column 10, line 18, "massages" should read --messages--.

Signed and Sealed this

Twenty-ninth Day of July 1986

[SEAL]

Attest:

DONALD J. QUIGG

Attesting Officer

Commissioner of Patents and Trademarks